United States Patent
Shih et al.

(10) Patent No.: US 10,797,959 B2
(45) Date of Patent: Oct. 6, 2020

(54) LLDP BASED RACK MANAGEMENT CONTROLLER

(71) Applicant: QUANTA COMPUTER INC., Taoyuan (TW)

(72) Inventors: Ching-Chih Shih, Taoyuan (TW); Ching-He Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/798,951

(22) Filed: Oct. 31, 2017

(65) Prior Publication Data

US 2019/0052538 A1    Feb. 14, 2019

Related U.S. Application Data

(60) Provisional application No. 62/544,603, filed on Aug. 11, 2017.

(51) Int. Cl.
| | | |
|---|---|---|
| *G06F 15/16* | (2006.01) | |
| *H04L 12/24* | (2006.01) | |
| *H04L 12/26* | (2006.01) | |
| *G06F 1/3206* | (2019.01) | |
| *G06F 1/28* | (2006.01) | |

(52) U.S. Cl.
CPC ............... *H04L 41/14* (2013.01); *G06F 1/28* (2013.01); *G06F 1/3206* (2013.01); *H04L 41/0833* (2013.01); *H04L 41/12* (2013.01); *H04L 43/0817* (2013.01); *H04L 41/046* (2013.01); *H04L 41/0853* (2013.01)

(58) Field of Classification Search
CPC ...................... H04L 29/08072; H04L 61/2528
USPC ................... 709/220, 224, 228, 226
See application file for complete search history.

(56) References Cited

U.S. PATENT DOCUMENTS

| | | | | |
|---|---|---|---|---|
| 8,824,506 | B2* | 9/2014 | Shukla | H04L 12/462 370/474 |
| 9,160,565 | B2* | 10/2015 | Shukla | H04L 12/462 |
| 9,184,980 | B1* | 11/2015 | Aman | H04L 29/08072 |
| 9,935,831 | B1* | 4/2018 | Wundsam | H04L 41/0816 |
| 10,085,273 | B2* | 9/2018 | Li | H04L 47/20 |

(Continued)

FOREIGN PATENT DOCUMENTS

| | | |
|---|---|---|
| JP | 2012227804 A | 11/2012 |
| JP | 2015076854 A | 4/2015 |

(Continued)

OTHER PUBLICATIONS

Extended European Search Report for EP Application No. 18150794.8, dated Aug. 1, 2018.

(Continued)

*Primary Examiner* — Khanh Q Dinh
(74) *Attorney, Agent, or Firm* — Nixon Peabody LLP

(57) ABSTRACT

What is disclosed is a system and method to use discovery packets, such as in an LLDP message, for determining operational status of a rack system. A network device is connected to the port of a switch. Operational data may be sent or received via a discovery packet to the network device. The operational data may be determined by a management agent on the network device and sent to a management controller via the discovery packet. The operational data may be determined by the management controller and sent to the network device.

17 Claims, 11 Drawing Sheets

(56) References Cited

U.S. PATENT DOCUMENTS

| | | | |
|---|---|---|---|
| 10,142,160 B1* | 11/2018 | Adams | H04L 41/12 |
| 10,250,529 B2* | 4/2019 | Maier | H04L 49/70 |
| 10,439,322 B1* | 10/2019 | Miller | H01R 13/62 |
| 2012/0155467 A1* | 6/2012 | Appenzeller | H04L 45/54 |
| | | | 370/392 |
| 2012/0281698 A1* | 11/2012 | Forster | H04L 41/0806 |
| | | | 370/392 |
| 2013/0097335 A1* | 4/2013 | Jiang | H04L 61/2528 |
| | | | 709/245 |
| 2013/0176892 A1* | 7/2013 | Shukla | H04L 12/462 |
| | | | 370/254 |
| 2014/0122910 A1 | 5/2014 | Chiu et al. | |
| 2014/0195704 A1 | 7/2014 | Bhatia et al. | |
| 2015/0271010 A1 | 9/2015 | Shetty et al. | |
| 2016/0014073 A1 | 1/2016 | Reddy et al. | |
| 2016/0020993 A1* | 1/2016 | Wu | H04L 45/14 |
| | | | 370/392 |
| 2016/0055354 A1* | 2/2016 | Jinaraj | G06F 21/81 |
| | | | 726/36 |
| 2017/0099209 A1* | 4/2017 | Hsueh | H04L 67/16 |
| 2020/0092804 A1* | 3/2020 | Patwardhan | H04W 52/0209 |

FOREIGN PATENT DOCUMENTS

| | | |
|---|---|---|
| JP | 2016111648 A | 6/2016 |
| TW | 201203936 A | 1/2012 |

OTHER PUBLICATIONS

TW Office Action for Application No. 106144394, dated Sep. 6, 2018, w/ First Office Action Summary.

TW Search Report for Application No. 106144394, dated Sep. 6, 2018, w/ First Office Action.

JP Office Action for Application No. 2018-023646, dated Jan. 15, 2019, w/ First Office Action Summary.

* cited by examiner

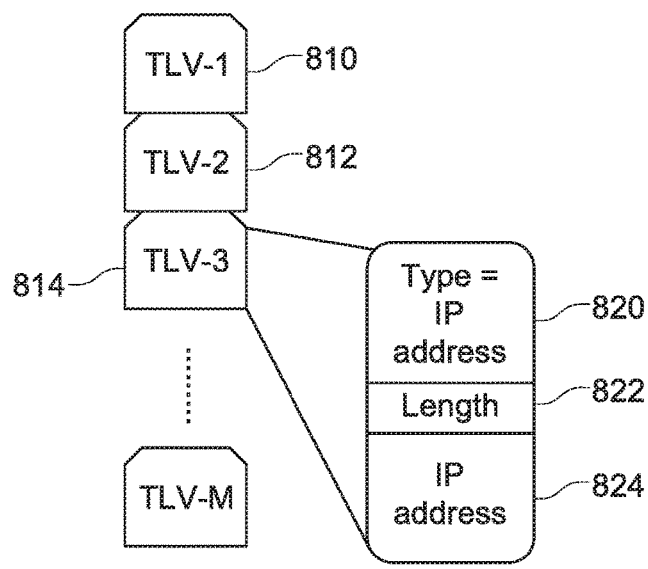
FIG. 8A
FIG. 8B
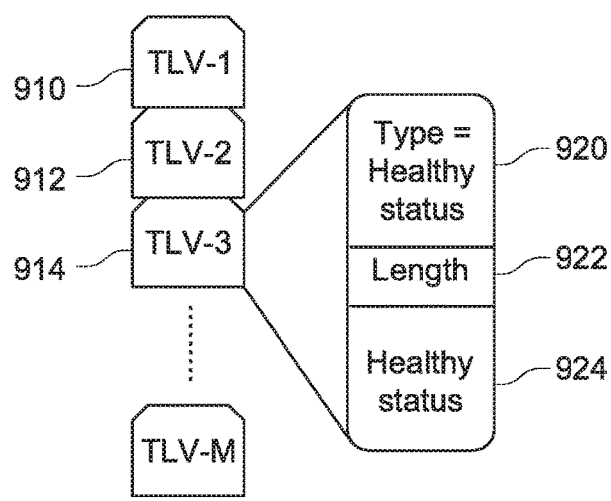
FIG. 9A
FIG. 9B

LLDP BASED RACK MANAGEMENT CONTROLLER

PRIORITY CLAIM

The present application claims priority to U.S. Provisional Application No. 62/544,603 filed Aug. 11, 2017. The entirety of that application is hereby incorporated by reference.

TECHNICAL FIELD

The present disclosure relates generally to rack management system for data centers. More particularly, aspects of this disclosure relate to using different methods to identify operational information relating to rack mounted devices in a data center.

BACKGROUND

The emergence of the cloud for computing applications has increased the demand for off-site installations, known as data centers, that store data and run applications accessed by remotely connected computer device users. Such data centers typically have massive numbers of servers, switches and storage devices to store and manage data, so they may be accessed in a convenient manner by remote computer users. A typical data center has physical rack structures with attendant power and communication connections. The racks are arranged in rows throughout the room or rooms of the data center. Each rack includes a frame that has vertically oriented slots or chassis that may hold multiple devices such as servers, switches and storage devices. There are many such devices stacked in such rack structures found in a modern data center. For example, some data centers have tens of thousands of servers, and attendant storage devices, and network switches. Thus, a typical data center may include tens of thousands, or even hundreds of thousands, of devices in hundreds or thousands of individual racks. Data centers typically have an administrative system in a control center to monitor and insure proper operation of the equipment. For efficient management, an administrator relies on instantaneous knowledge of the status of the equipment in the data center.

A typical rack system 10 is shown in FIG. 1. The rack system 10 includes a rack management controller (RMC) 12 that is coupled to a backplane 14. The backplane 14 is connected to network devices 16 and monitors power consumption and other operational data of the network devices 16. The network devices 16 may be servers, switches, routers or the like. Each of the network devices 16 include a baseboard management controller 18 that communicates with the backplane 14. The rack system 10 has a frame having a number of physical slots that hold the network devices 16. The backplane 14 may be connected to each of the network devices 16. The network devices 16 may also have a network interface to establish connections to data center management software via a switch device.

The rack management controller 12 plays an important role in management of a data center. The rack management controller 12 collects rack based operation information for data center management software such as: (1) rack total power consumption; (2) an IP address list from each of the network devices; (3) overall and individual rack component health status and (4) rack based fan & thermal status. Such information may be used by data center management software to perform functions such as rack power capping or updating rack IDs to all management units of the rack such as the rack management controller 12. Thus, a manager may monitor the performance remotely of the devices in each rack system in the data center by the collection of such information by the rack management controller 12.

There are some well-known ways to implement the rack management controller 12 communication with the backplane 14. For example, the rack management controller 12 may use an inter-integrated circuit protocol (I2C); a universal asynchronous receiver/transmitter (UART); or a network to communicate operational data with the baseboard management controllers 18 of the network devices 16. However, such a system usually requires a proprietary hardware design like adding the backplane 14 to route the I2C or UART links between the rack management controller 12 and the baseboard management controllers 18 on the network devices 16. The need for a dedicated backplane increases the costs of the system.

Other communication mediums may be used to exchange operational data between the network devices in a rack and a rack management controller. FIG. 2 shows another rack system 50 that includes a rack management controller 52 that is coupled via a network connection to a management switch 54. The network connection is a separate VLAN that includes the rack management controller 52 and the management switch 54. The management switch 54 includes ports that are connected to network devices 56 via respective baseboard management controllers 58. The network devices 56 are thus also part of the separate VLAN. Thus the rack management controller 52 may obtain device operational data via the network from the network devices 56. Such information may be sent via an IP based network protocol such as the intelligent platform management interface (IPMI) protocol, the Redfish protocol, or even a network protocol used by the network devices 56 to exchange data with the network.

The disadvantage of such an IP based network management interface is that it requires a rack scope VLAN for the management switch 54 to isolate the rack management interface for security reasons Further, it is a challenge to deploy a separate IP address to each of the management components of the rack thereby adding additional complexity to the rack system 50.

Thus, there is a need for a rack management system that can support rack management data without using a separate backplane. There is a need for a rack management system that avoids using a VLAN to ensure security. There is also a need for a rack management system that allows for the exchange of operational data between a rack management controller and the rack devices.

SUMMARY

One disclosed example is a method of determining operational data from a network device. The network device is coupled to a management controller. The networked device is connected to a port of a switch. Operational data based on the operation of the network device is determined. A discovery packet including the operational data is sent to the management controller.

Another example is a method of sending operational data to a network device. The network device is coupled to a management controller. The network device is connected to a port of a switch. Operational data relating to the operation of the network device is determined. A discovery packet including the operational data is sent to the network device.

Another example is a rack system having a switch including a port. A network device is coupled to the port. The rack system includes a rack management controller to send and receive discovery packets to and from the network device. The discovery packets include operational data associated with the network device.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 8A is diagram of an LLDP packet that includes IP address information for a system node;

FIG. 8B is a table of ports and corresponding IP addresses generated by the LLDP packet in FIG. 8A.

FIG. 9A is a diagram of an LLDP packet that includes the health status of a system node;

FIG. 9B is a table of ports and corresponding health status generated by using the LLDP packet in FIG. 9A

Figure 1:
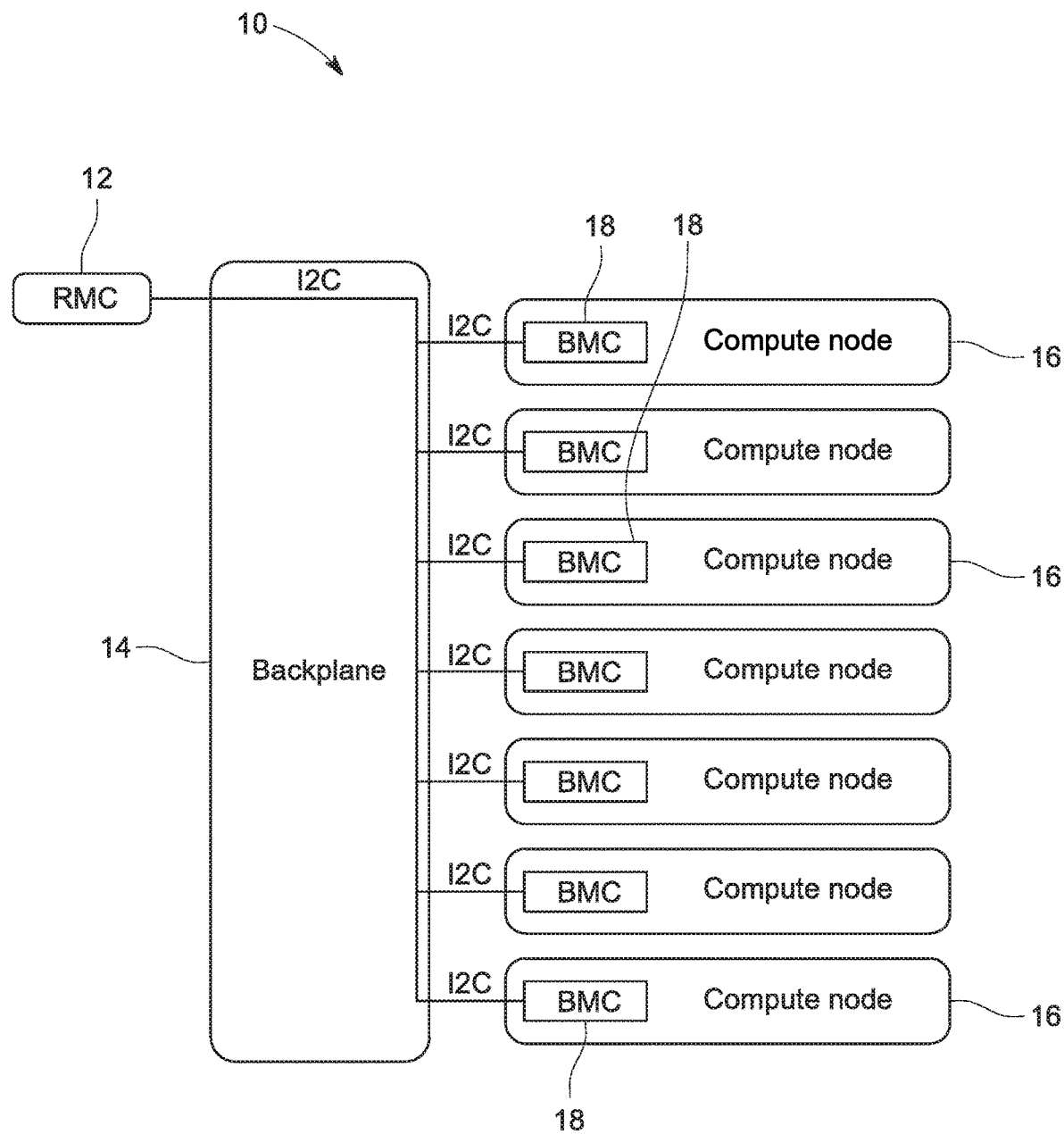
FIG. 1 shows a prior art rack system in a data center with either I2C or UART communication to network devices through a backplane.
Figure 2:
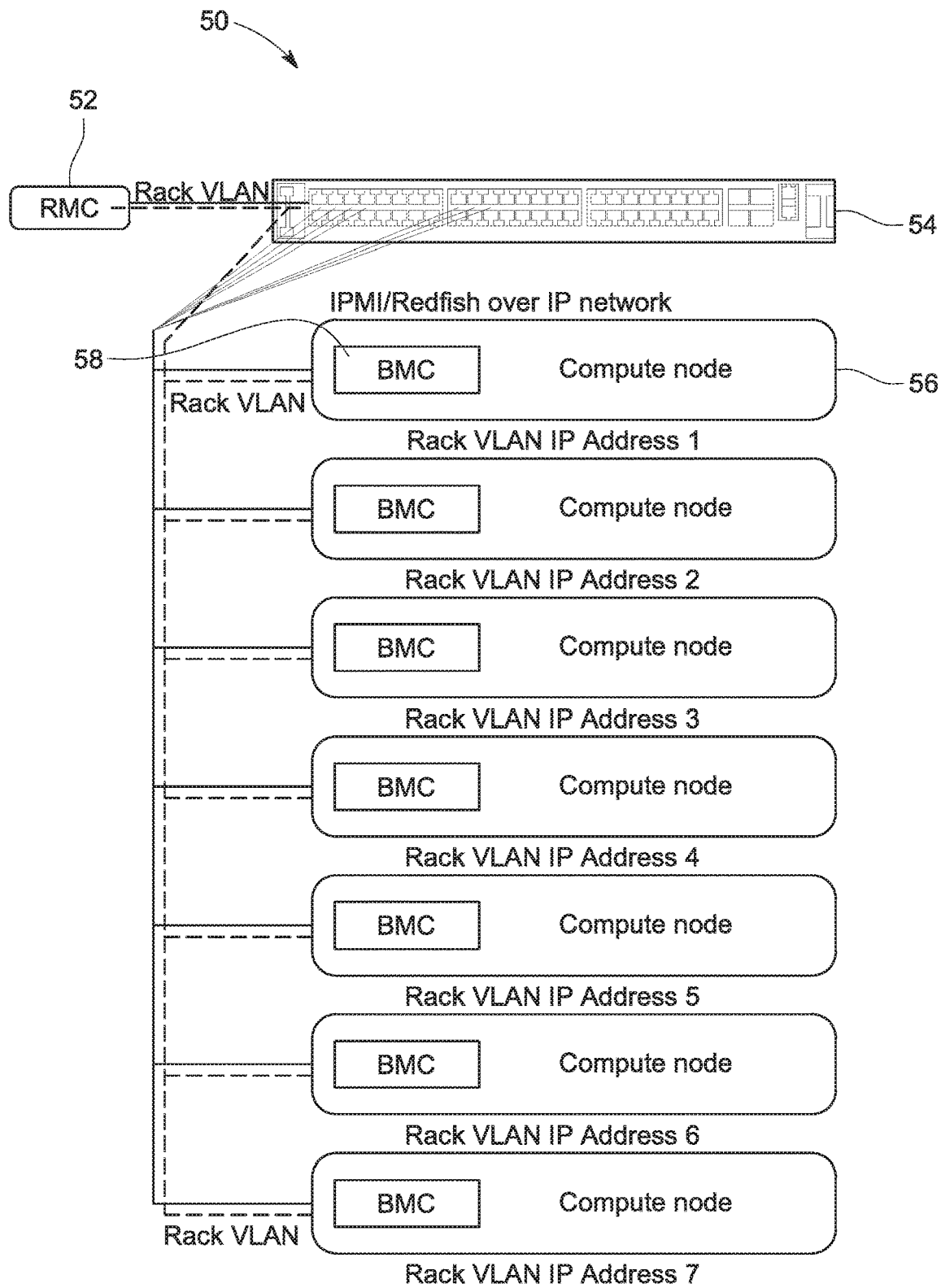
FIG. 2 shows a prior art rack system in a data center with a network based connection to network devices.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Figure 3:
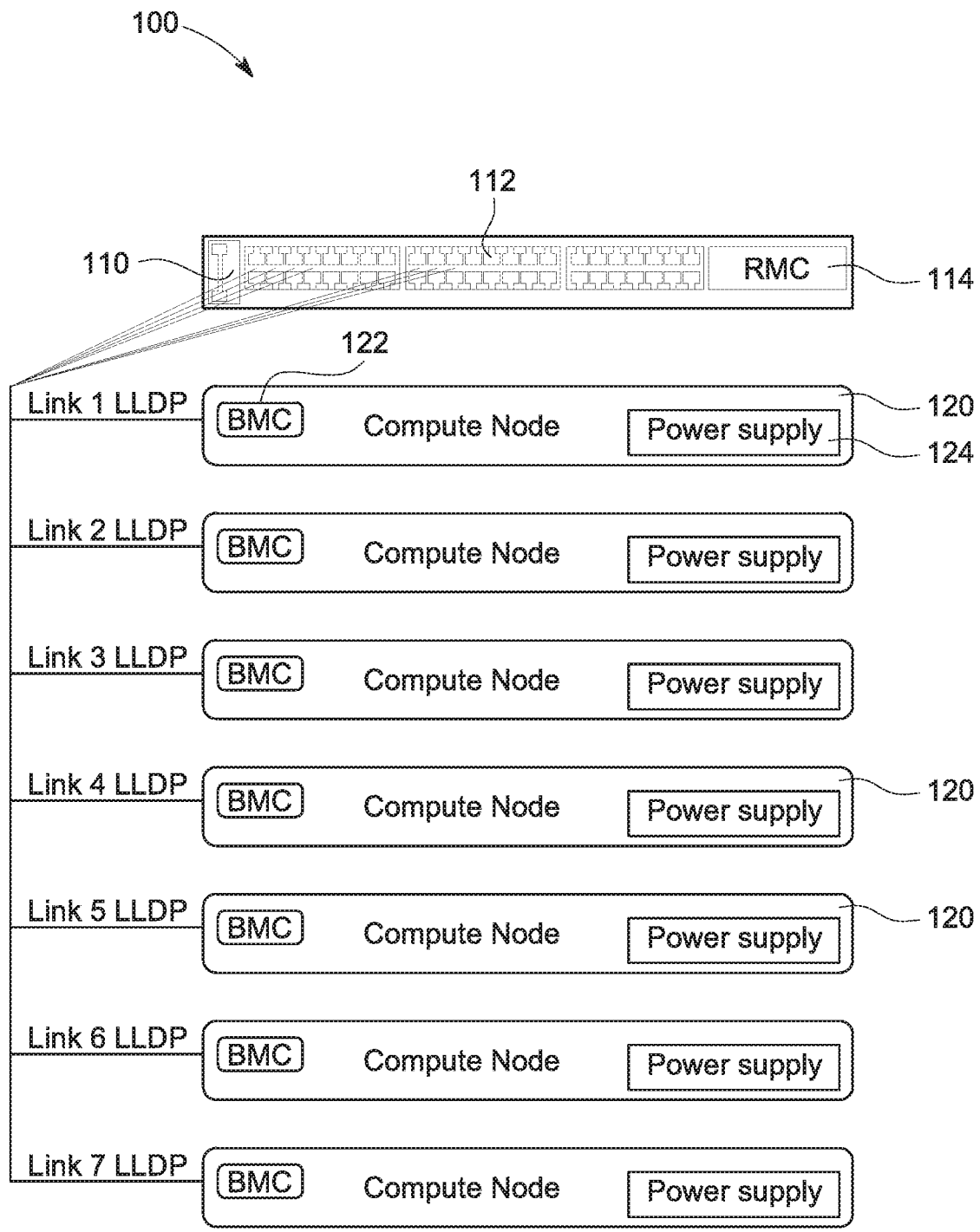
FIG. 3 is a block diagram of a rack system that allows a rack management controller to monitor network devices without extra backplane hardware or a separate network.

FIG. 3 is a block diagram of a rack system 100 that may reside in a data center. The rack system 100 includes a rack frame having a number of slots or chassis. Each of the slots may hold at least one network device, such as a server associated with the rack system 100. Other network devices may include switches, routers, servers, etc. In this example, the rack system 100 includes a management switch 110 that has multiple ports 112. The management switch 110 is controlled by a management switch controller 114. Each of the ports may be connected to one of the network devices 120 that are located in the slots of the rack frame. Each of the network devices 120 includes a baseboard management controller 122 that monitors the operational data of the respective network device 120. Such operational data may include fan status, fan speed, thermal status of the components, power consumption, CPU utilization, I/O utilization, memory utilization. CPU error, memory error, etc. For example, the power consumption may be determined by the baseboard management controller 122 by monitoring a power supply 124 on each of the network devices 120.

The rack system 100 allows an rack management controller software stack to be executed on the management switch controller 114 of the management switch 110. Thus, in this example, the management switch controller 114 functions as the rack management controller for the rack system 100. Alternatively, a separate rack management controller with "Remote Switch LLDP Control" also can be used. Instead of using an IP based protocol as the management network message transport protocol, a link-layer discovery protocol (LLDP) signal is used to transport control messages between the rack management controller 114 and other management units such as the baseboard management controllers 122 of the network devices 120 in the rack system 100.

Messages according to LLDP are characterized by the fact that the packet scope is limited to the link which exists between the switch port of the management switch 120 and the management unit of the connected network device. The LLDP to a particular network device is not forwarded to devices connected to other ports of the management switch 120. According to this characteristic, this link established with a LLDP signal becomes a secure link between the rack management controller and a particular network device allowing the exchange of management messages without performing authentication.

Through information received through messages from the LLDP signal, the rack management controller (RMC) may collect rack based information from the network devices 120 such as: (1) rack total power consumption; (2) an IP address list; (3) overall and individual rack component health status; and (4) rack based fan & thermal status. This information on the rack system 100 may be sent via a management network to data center management software. The rack management controller 114 may also perform rack power capping or update rack identification information to all management units of the devices 120 of the rack system 100 by sending LLDP signals to the network devices 120. Other commands that may be sent may include power on/off control, an identify LED control and any control signal for the baseboard management controller of the network devices 120.

The rack management controller 114 may report total rack power consumption to data center management software on a data center management system. Based on the rack power consumption, the data center management software may schedule a new workload to a rack system such as the rack system 100 in the data center that best fits the consumption to prevent rack power over consumption.

Figure 4:
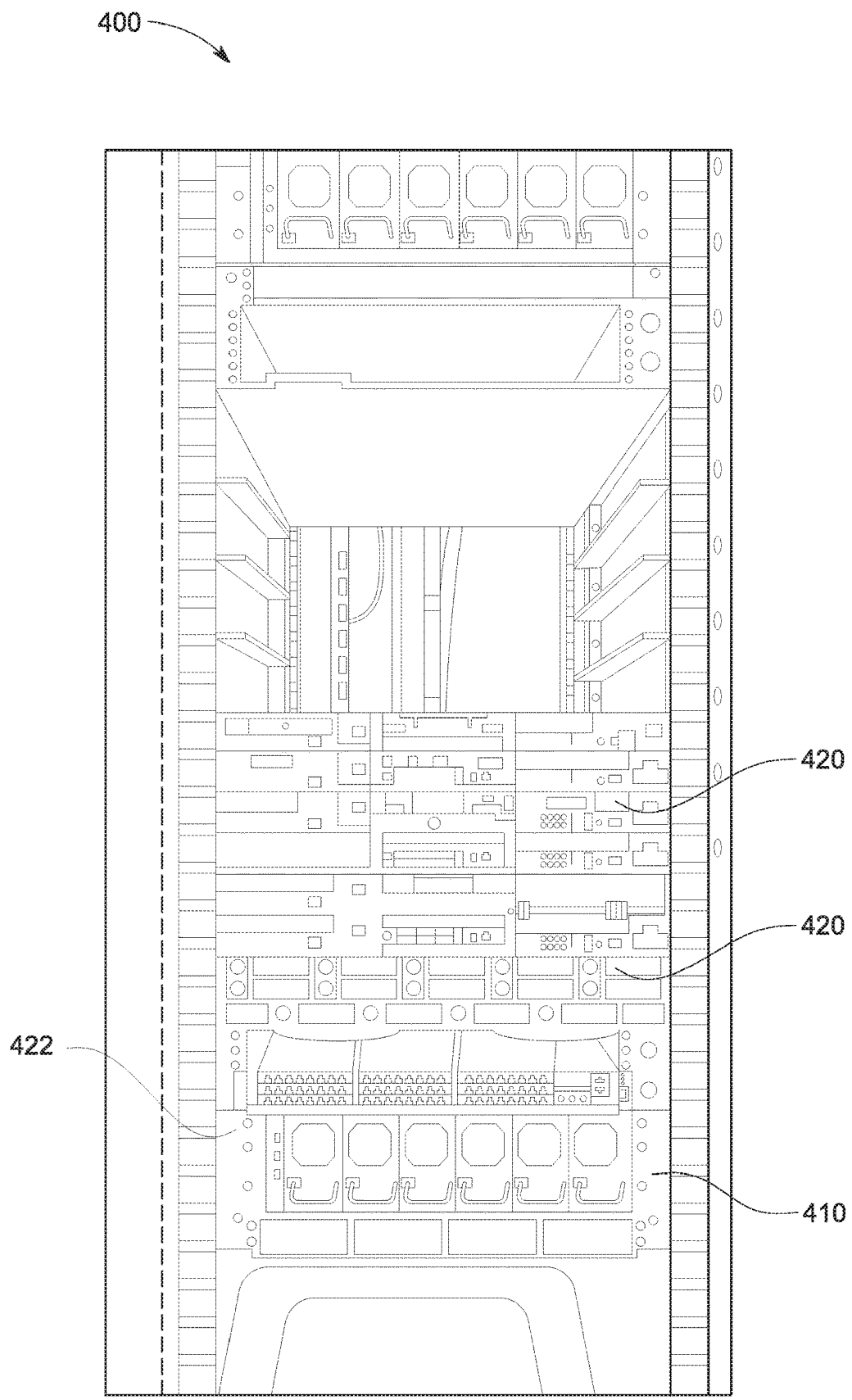
FIG. 4 is a back view of the rack system having a common power source (power shelf) for rack devices.

FIG. 4 is a back view of an Open Compute Project (OCP) type rack 400 which includes a rack based power system 410 that is termed a power shelf. The rack 400 includes a number of network devices 420 such as servers. The power shelf 410 includes a power source operated by a power controller (not shown) that powers all of the network devices 420 in the rack 400. Each power shelf such as the power shelf 410 includes a rack management controller 422 that directly connects to the power controller of the power shelf 410. The power controller thus monitors the total power of the power shelf and allows the rack management controller 422 to easily report the rack total power consumption using the above described LLDP method. Alternatively, a network controller may be associated with the power shelf and send power status to the rack management controller 422.

Figure 5:
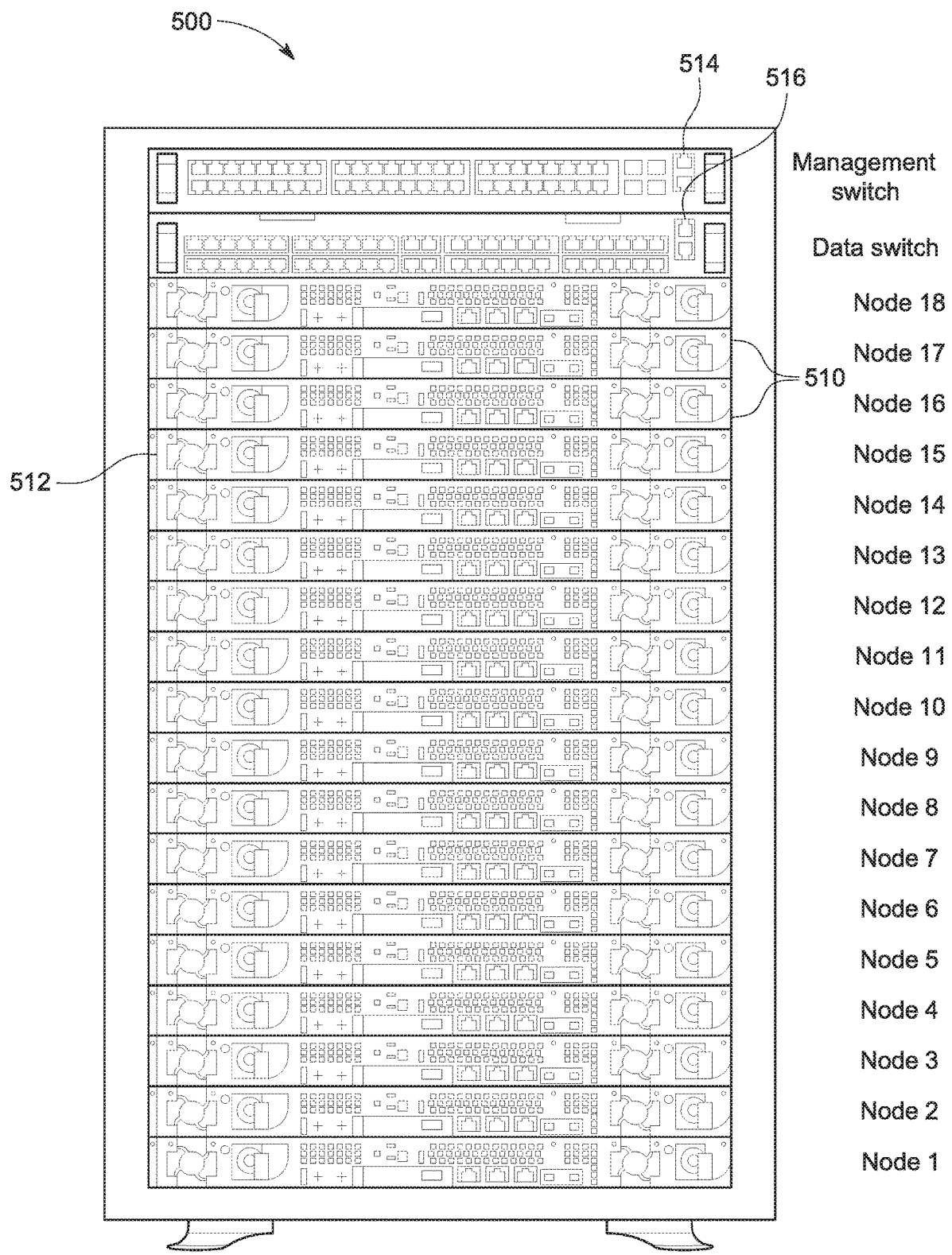
FIG. 5 is a back view of the rack system having a separate power source for each of the rack devices.

FIG. 5 shows an EIA rack 500 that holds network devices 510, each with its own power supply 512. The rack 500 also holds a management switch 514 and a data switch 516. In this example, the management switch 514 includes a rack management controller (not shown). The management switch 514 and the data switch 516 have multiple ports for connection to the network devices 510. Network devices 510 such as servers in the 19" Electronic Industries Alliance (EIA) rack 500 each have individual power supplies 512, so a system cannot collect total rack power consumption by the rack management controller directly. An algorithm running on the rack management controller may determine the total rack power consumption by determining the individual power consumption for each device from the individual LLDP signals.

Figure 6:
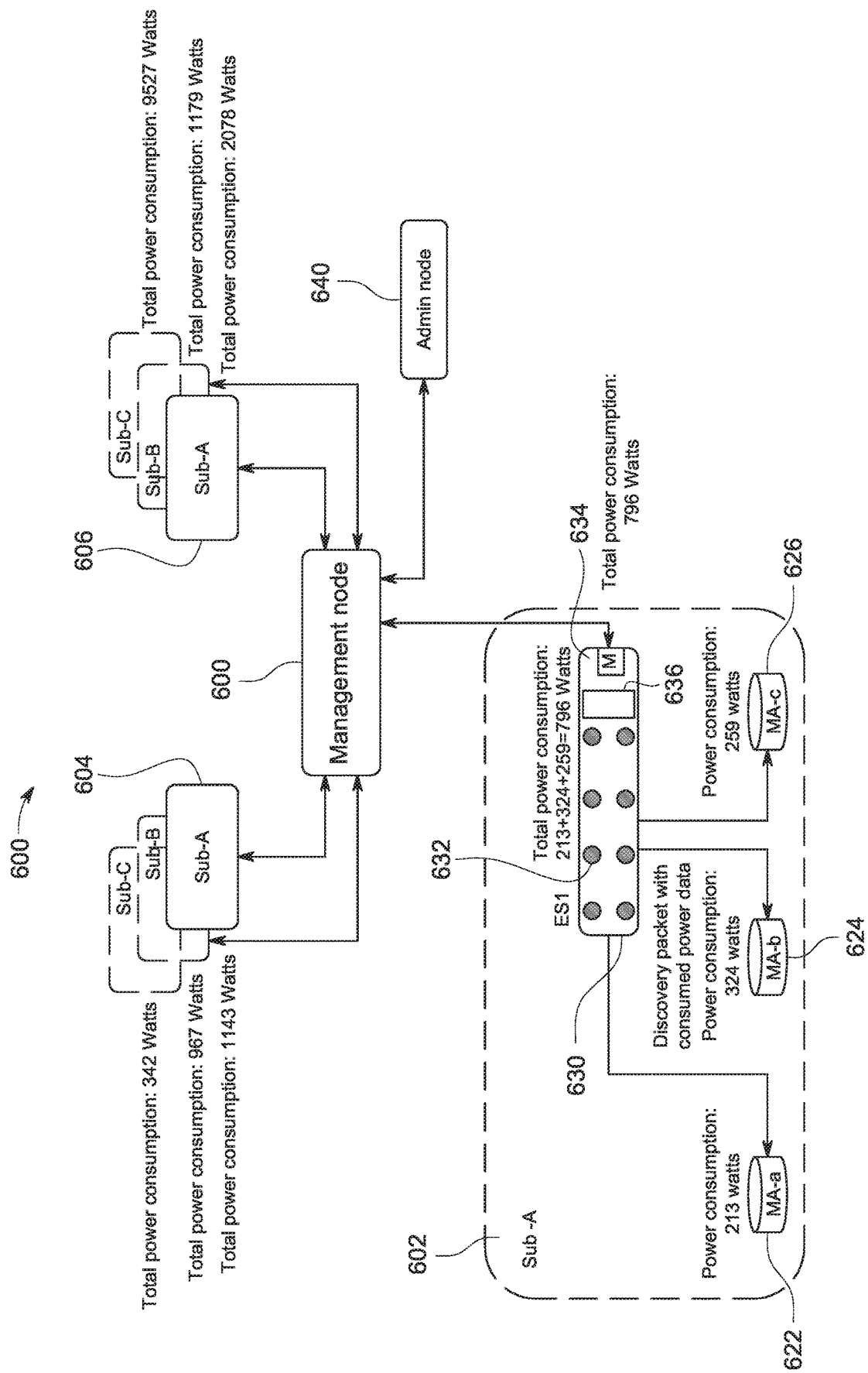
FIG. 6 is a block diagram of a Ethernet based rack system that allows collection of operational data via an LLDP packet.

In an Ethernet switching network environment, for management purposes, each node has a management agent with a secure network connection (which is isolated from a specific data network). This secure network that connects the management agent with the network devices may be termed the management network. FIG. 6 shows an Ethernet switching network environment used in a data center that includes a management node 600 that is coupled to subsystems 602, 604 and 606. In this example, the management node 600 and the subsystems 602, 604 and 606 are in the same network. In this example, each of the subsystems 602, 604 and 606 represent a separate rack system similar to the rack system 300 in FIG. 3. The example subsystem 602 includes a number of computer system nodes 620, 622 and 624 and at least one Ethernet switching device 630. Each of the nodes 620, 622 and 624 in this example are connected to the network ports of the Ethernet switching device 630 and thus are also considered network devices that are mounted on a rack with the Ethernet switching device 630. Each of the nodes 620, 622 and 624 have a management agent such as a controller that connect the network port to switching ports of an Ethernet switching device such as the Ethernet switch 630. The Ethernet switch 630 includes a number of ports 632, a management port 634 and a controller 636 that may function as the rack management controller. An administration node 640 may be in the management node, or may be connected to the management node 600. The administration node 640 may query total power consumption of all subsystems 602, 604 and 606 at any time that may be determined by the management node 600.

When a system node with a management agent joins one of the subsystems 602, 604 or 606, the network port of the new system node is connected to one of the ports of the Ethernet switch of the subsystem. The management agents (inside the system nodes), such as baseboard management controllers, embed an application sent by the management node 600 that enables operational data such as power consumption data, fan operational data, thermal data, identification data, etc. to be carried by a discovery packet and be announced to the Ethernet switch 630.

Figure 7:
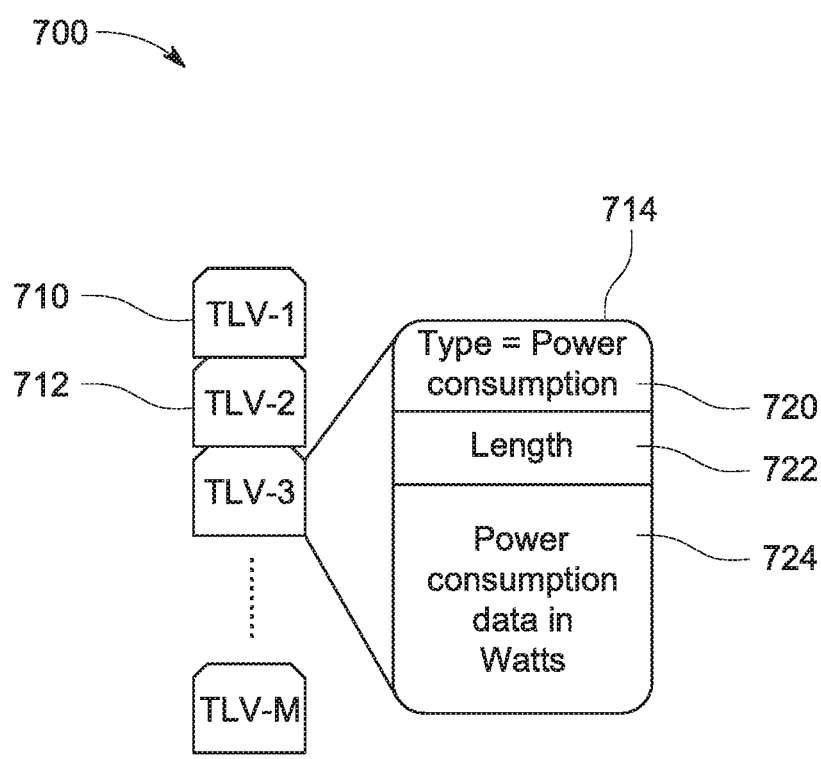
FIG. 7 is a block diagram for an LLDP packet storing power consumption information.

FIG. 7 shows an example of a discovery packet 700 containing consumed power data from one of the system nodes such as nodes 622, 624, or 626 (shown in FIG. 6). In this example, the discovery packet 700 may be formatted according to a public networking protocol such as link layer discovery protocol (LLDP) or according to a proprietary protocol such as Cisco Discovery Protocol (CDP). The discovery packet 700 includes a sequence of time length value (TLV) structures 710, 712 and 714. Each of the time length value structures 710, 712 and 714 include an organizationally defined information string. In this example, one of the TLV structures 714 includes a type field 720, a length field 722 and a power consumption field 724. In this example, the type field 720 includes a code indicating power consumption, the length field 722 includes data indicating the length of the TLV, and the power consumption field 724 includes the power consumption value from the system node that sent the discovery packet 700.

In the system shown in FIG. 6, an Ethernet switch such as the Ethernet switch 630 (corresponding to management agents of system nodes 622, 624, and 626) receives discovering packets such as the packet 700 in FIG. 7, and retrieves operational data from the packet. In this example, power consumption data from the node may be read from the discovery packet such as the packet 700 in FIG. 7. In FIG. 6, the Ethernet switch 630 then gathers the power data and sums the power data for each of the network devices in the subsystem 602. The Ethernet switch 630 then notifies and sends total power consumption data for the subsystem 602 to the management node (MN) 600 via the management port 634. This process may be event-triggered, or reported periodically from the Ethernet switch 630 to the management node 600 based on system requirements and application design.

Another method that may be used by the Ethernet system 600 in FIG. 6 is an LLDP based rack total power consumption algorithm. Via this method, with a pre-configured discovery packet such as the packet 700 in FIG. 7, the total power consumption within any subsystem (such as the switching networks 602, 604 and 606 in FIG. 6) could be obtained by Ethernet switch devices directly. The loading of the management node 600 in FIG. 6 could be reduced because the management node does not query each node's power consumption data via an IP-based communication. Instead the management node just queries the Ethernet switch devices such as the Ethernet switch 630 for the corresponding subsystem 602 in FIG. 6. The system also improves the traditional rack-based design. The power consumption is not just measured by a power supply unit (PSU) that powers a group of nodes but is summed up by the power consumption from each of nodes. Thus, the system allows management via the power information for each node. Further, Ethernet switch devices can actively detect inserted nodes and determine the latest power data for the subsystem of the Ethernet switch device.

A different type of LLDP packet may be used to collect the IP address and location information of different components in a particular subsystem and then report this data to data center management software that may be running on the management node 600 in FIG. 6. This process is an important rack discovery feature. In this example, the rack management controller on the Ethernet switch 630 in FIG. 6 may use LLDP packets such as the LLDP packet 800 shown in FIG. 8A to collect IP address from all management agents of the rack.

In this example, the discovery packet 800 may be formatted according to a public networking protocol such as link layer discovery protocol (LLDP) or according to a proprietary protocol such as Cisco Discovery Protocol (CDP). The discovery packet 800 includes a sequence of time length value (TLV) structures 810, 812 and 814. Each of the time length value structures 810, 812 and 814 include an organizationally defined information string. In this example, one of the TLV structures 814 includes a type field 820, a length field 822 and an IP address field 824. In this example, the type field 820 includes a code indicating the TLV structure 814 contains an IP address. The length field 822 includes data indicating the length of the TLV. The IP address field 824 includes the IP address and port number from the system node that sent the discovery packet 800.

After collecting discovery packets similar to the discovery packet 800 in FIG. 8A from the nodes, the rack management controller on the Ethernet switch 630 in FIG. 6 may then provide the IP address list to the management node 600. FIG. 8B shows a table 850 that may be generated that includes the IP addresses and corresponding port numbers for the components (nodes) of a particular subsystem such as the subsystem 602 in FIG. 6 that represent devices in a rack system.

Another type of operational data may be collected using LLDP packets in the system 600 in FIG. 6 is status information from all management agents of the rack. After such data is collected, the RMC on an Ethernet switch such as the Ethernet switch 630 may then provide individual and overall health status of the subsystem 602 to the management node 600 in FIG. 6. In this example, there are three levels of health status for a system node: OK, Warning, and Critical. Of course other types or levels of health status may be used. In this example, after all the discovery packets have been received from network devices in a rack, the RMC may classify the overall rack status. In this example, if all of management agents report "OK" to the RMC then the overall health status is "OK." If any of the management agents report "Critical" to RMC then the overall health status is "Critical." If there are no management agents that report "Critical" to the RMC but some of them report "Warning" then the overall health status will become "Warning."

As shown in FIG. 9A, in this example, a discovery packet 900 may be formatted according to a public networking protocol such as link layer discovery protocol (LLDP) or according to a proprietary protocol such as Cisco Discovery Protocol (CDP). The discovery packet 900 includes a sequence of time length value (TLV) structures 910, 912 and 914. Each of the time length value structures 910, 912 and 914 include an organizationally defined information string. In this example, one of the TLV structures 914 includes a type field 920, a length field 922 and a health status field 924. In this example, the type field 920 includes a code indicating the TLV structure 914 contains a status. The length field 922 includes data indicating the length of the TLV. The health status field 924 includes one of the three status categories of the system node that sent the discovery packet 900.

FIG. 9B shows a table 950 of status identifiers and port numbers that is compiled by the rack management controller on the Ethernet switch 630 in FIG. 6 based on receiving discovery packets similar to the discovery packet in FIG. 9B. The table 950 thus provides a reference for the status of every node on a particular rack such as the subsystem 602 in FIG. 6. As explained above, the port 10 has a status of "Warning," and thus the overall rack status is set to warning in the table 950.

The rack management controller can also use LLDP packets to command management agents to limit the maximum power consumption for the associated node. In such a procedure, the management node 600 sends a total rack power capping value to the rack management controller on the Ethernet switch 630 in FIG. 6. The rack management controller then sends the maximum power to the management agent to perform rack power capping by a LLDP packet such as the LLDP packet 1000 shown in FIG. 10. In this example, the rack management controller may determine the power cap for each node and send the appropriate value via the LLDP packet.

Figure 10:
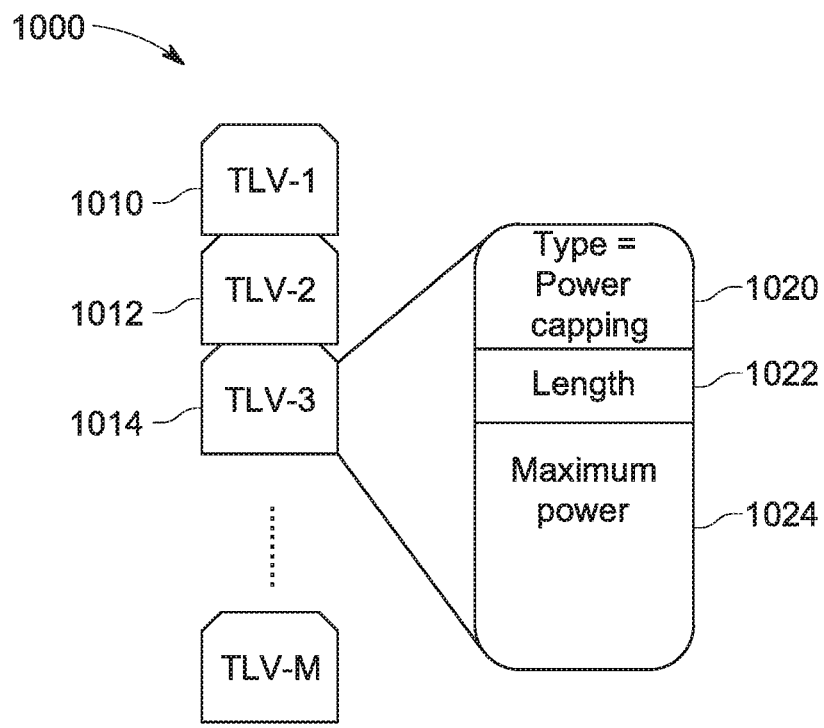
FIG. 10 is a diagram of an LLDP packet that includes power capping data.

As shown in FIG. 10, the discovery packet 1000 may be formatted according to a public networking protocol such as link layer discovery protocol (LLDP) or according to a proprietary protocol such as Cisco Discovery Protocol (CDP). The discovery packet 1000 includes a sequence of time length value (TLV) structures 1010, 1012 and 1014. Each of the time length value structures 1010, 1012 and 1014 include an organizationally defined information string. In this example, one of the TLV structures 1014 includes a type field 1020, a length field 1022 and a maximum power field 1024. The type field 1020 includes a code indicating the TLV structure 1014 contains a maximum power. The length field 1022 includes data indicating the length of the TLV. The maximum power field 1024 may be sent to a specific value or a maximum power value of the system node that receives the discovery packet 1000. After reading the discovery packet, the management agent such as the baseboard management controller for the system node will cap power to the maximum power value.

Each rack system may have a Rack ID. The Rack ID may be set by the management node 600 in FIG. 6, and sent to the rack management controller associated with the switch such as the Ethernet switch 630, for a particular rack subsystem such as the subsystem 602. The MAC address of the RMC, or its UUID, or any other unique identifier may be a candidate for being designated the Rack ID. The RMC can deploy the Rack ID by an LLDP packet 1100 in FIG. 11 to each management agent of each system node. Thus, each of the system nodes is associated with a particular rack by the Rack ID.

Figure 11:
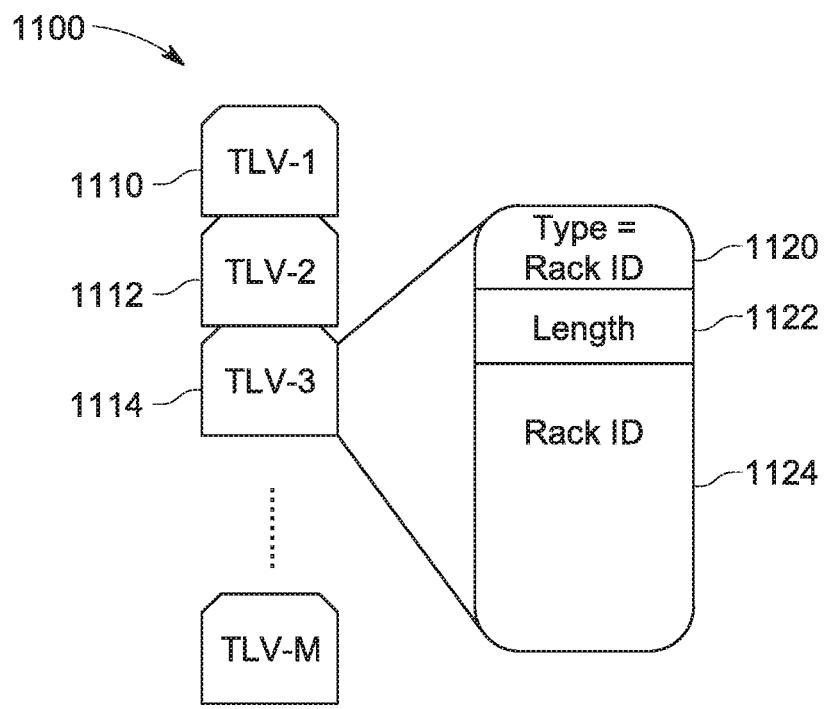
FIG. 11 is a diagram of an LLDP packet that includes rack ID data.

As shown in FIG. 11, the discovery packet 1100 may be formatted according to a public networking protocol such as link layer discovery protocol (LLDP) or according to a proprietary protocol such as Cisco Discovery Protocol (CDP). The discovery packet 1100 includes a sequence of time length value (TLV) structures 1110, 1112 and 1114. Each of the time length value structures 1110, 1112 and 1114 include an organizationally defined information string. In this example, one of the TLV structures 1114 includes a type field 1120, a length field 1122 and a Rack ID field 1124. In this example, the type field 1120 includes a code indicating the TLV structure 1114 contains a Rack ID. The length field 1122 includes data indicating the length of the TLV. The Rack ID field 1124 includes the Rack ID of the rack the system node is installed in that receives the discovery packet 1100. After reading the discovery packet, the management agent such as the controller for the system node will be associated with Rack ID.

Figure 12:
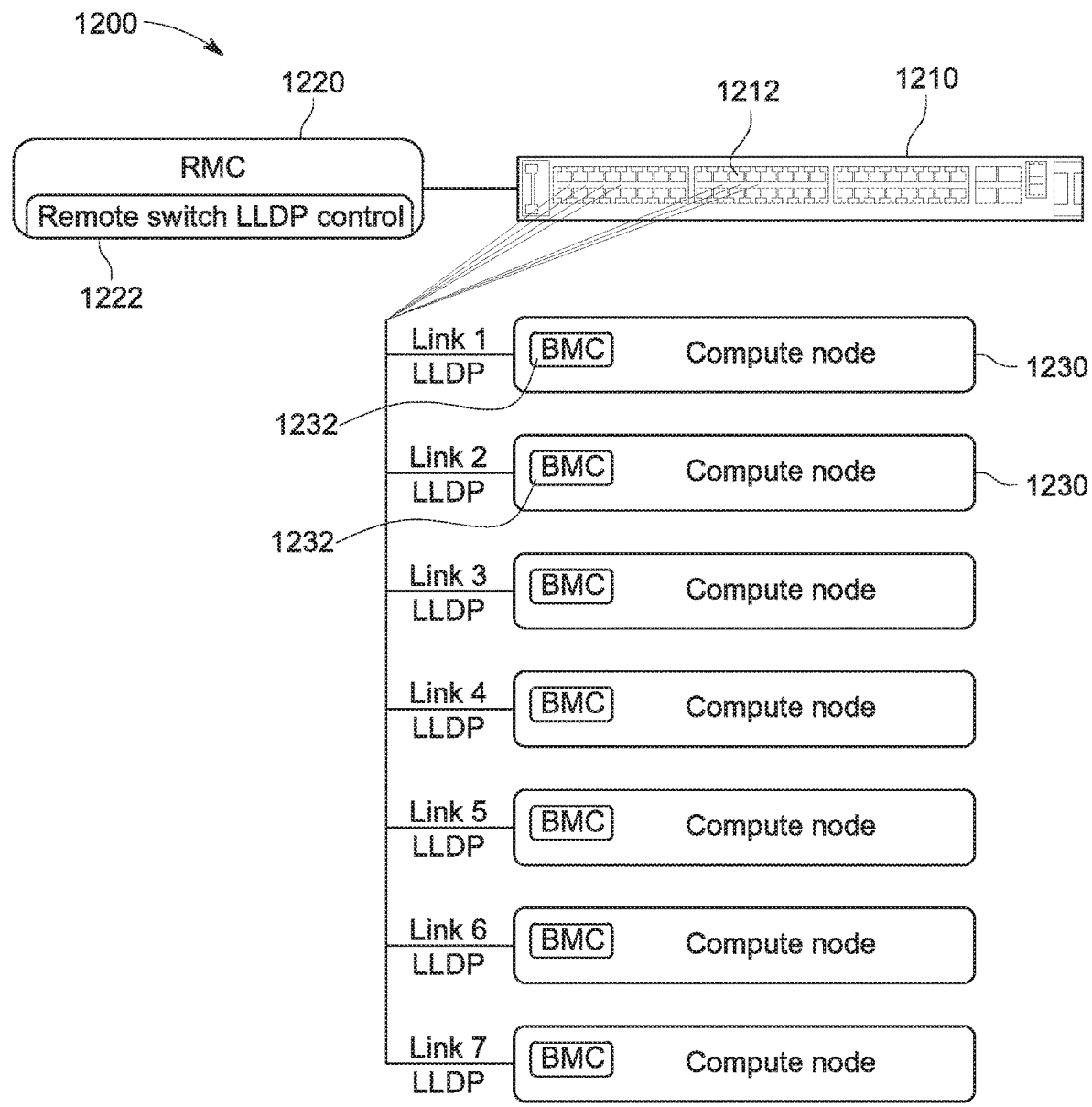
FIG. 12 is a block diagram of a rack system having an external rack management controller.

As explained above, the rack management controller can be directly embedded into the switch to direct LLDP messages as the system 600 in FIG. 6. Alternatively, a rack management controller that is not embedded into the switch can also support LLDP based management messages. FIG. 12 shows another rack system 1200, that includes a switch 1210 that is connected to a rack management controller 1220 via a management port. Rack devices such as devices 1230 are coupled to a series of ports 1212 in the switch 1210. Each of the devices 1230 includes a management agent in the form of a baseboard management controller 1232. The rack management controller 1220 is located externally from the switch 1210. The rack management controller 1220 in this example includes a "remote switch LLDP control" 1222. An external RMC may use a switch exported API or CLI to collect and control a switch LLDP to achieve similar functions of an embedded RMC in the switch that can direct handle switch LLDP.

The use of the LLDP packet in a management network for a rack system prevents overloading a network with IP based messages since the LLDP packet can be directed to a single node. Thus, the above described rack management controller may support a standard 19" EIA rack without a proprietary backplane and corresponding I2C or UART signals to determine operational status. Further, the use of LLDP as a transport protocol does not require extra security measures or IP address provisions. Alternatively, a single LLDP packet may include several different TLV structures that each contain different types of operational data. As explained above, other types of operational data other than power consumption, health status, fan status and thermal status may be reported by the management agents of the network devices.

Figures 13, 14:
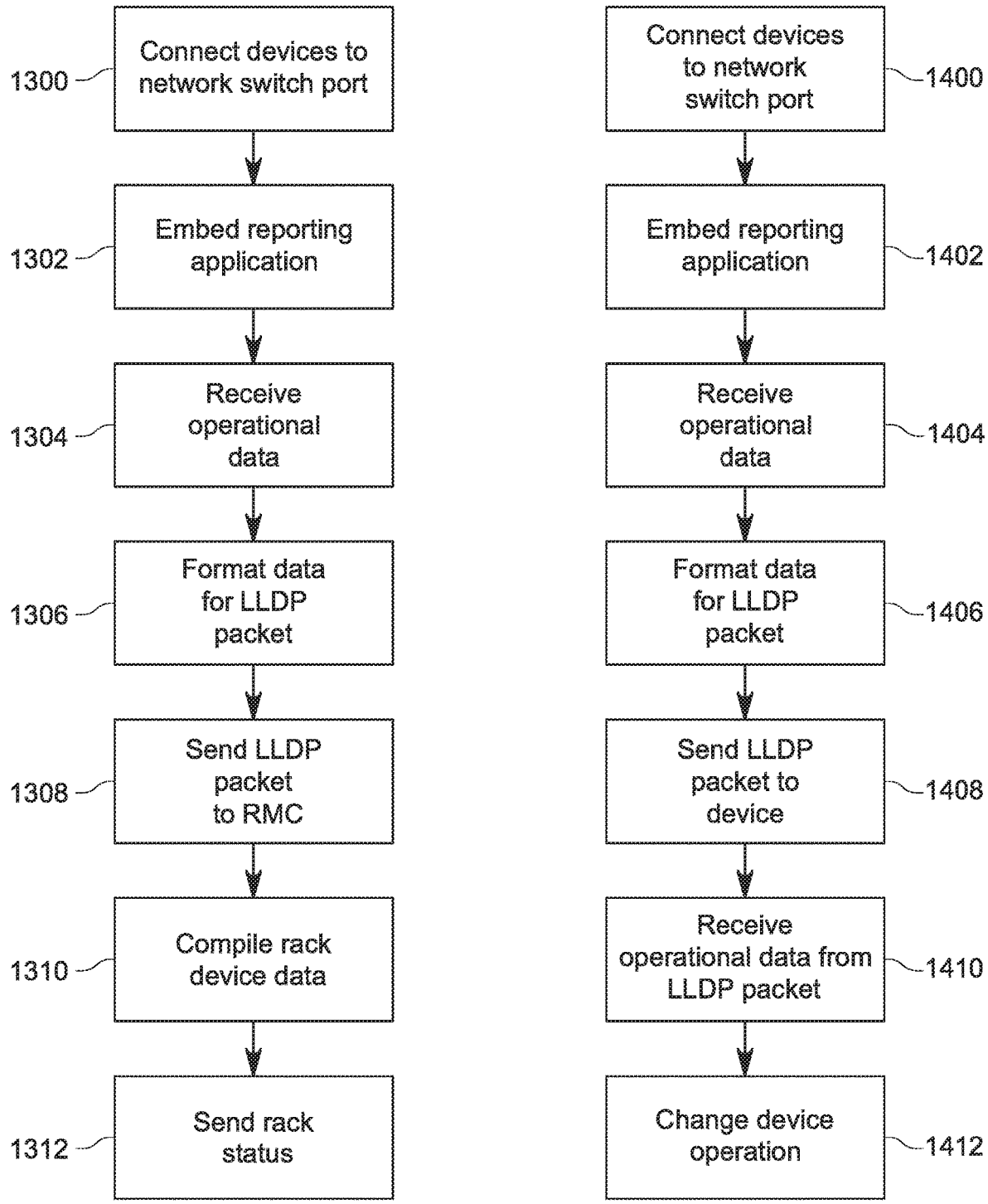
FIG. 13 is a flow diagram of the code executed by the rack management controller in FIG. 6 to obtain operational data from network devices using LLDP packets.
FIG. 14 is a flow diagram of the code executed by the rack management controller in FIG. 6 to send operational data using LLDP packets to network devices.

FIG. 13 shows a flow diagram of the code executed by the rack management controller in FIG. 6 to obtain operational data using LLDP packets. The flow diagram in FIG. 13 is representative of example machine readable instructions for the rack management controller either embedded in the switch 630 in FIG. 6 or externally located such as the rack management controller 1220 in FIG. 12. In this example, the machine readable instructions comprise an algorithm for execution by: (a) a processor, (b) a controller, and/or (c) one or more other suitable processing device(s). The algorithm may be embodied in software stored on tangible media such as, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 13 may be implemented manually. Further, although the example algorithm is described with reference to the flowcharts illustrated in FIG. 13, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In this example, the rack management controller learns of the connection of a network device such as the device 622 in FIG. 6 (1300). The rack management controller sends a reporting application that is embedded on the management agent such as a baseboard management controller associated with the device 622 in FIG. 6 (1302). The baseboard management controller receives operational data such as power consumption from the device 622 (1304). The reporting application directs the management agent to format the data in a specialized LLDP packet such as the packet 700 in FIG. 7 (1306). The LLDP packet is sent to the rack management controller (1308). The operational data from LLDP packets from each of the devices in the rack system are compiled by the rack management controller on the Ethernet switch 630 in FIG. 6 (1310). The overall rack status is then sent to a management controller such as the management node 600 in FIG. 6 (1312).

FIG. 14 shows a flow diagram of the code executed by the rack management controller in FIG. 6 to send operational data using LLDP packets to the rack system network devices. In this example, the rack management controller learns of the connection of a network device such as the device 622 in FIG. 6 (1400). The rack management controller sends a reporting application that is embedded on the management agent such as a baseboard management controller associated with the device 622 (1402). The rack management controller receives operational data such as rack ID information or power caps from the management node 600 in FIG. 6 (1404). The rack management controller formats the operational data in a specialized LLDP packet such as the packet 1000 in FIG. 10 (1406). The LLDP packet is sent to the network devices such as the device 622 in FIG. 6 (1408). The LLDP packets are received and the operational data is read by the management agent of the device 622 (1410). The operation of the device 622 is then changed in accordance with the operational data such as a power cap (1412). Of course if the operational data is information such as the rack ID, the operation of the device 622 is not changed.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media that can be used to store desired information. Computer-readable storage media can be accessed by one or more local or remote computing devices, e.g., via access requests, queries or other data retrieval protocols, for a variety of operations with respect to the information stored by the medium.

The terminology used herein is for the purpose of describing particular embodiments only, and is not intended to be limiting of the invention. As used herein, the singular forms "a", "an" and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method of determining operational data from a network device, the network device coupled to a management controller, the method comprising: connecting the network device to a port of a switch;
   determining power consumption of the network device by monitoring a power supply of the network device;
   determining operational data based on the operation of the network device, wherein the operational data includes the power consumption of the network device;
   sending a discovery packet including the operational data to the management controller,
   wherein the discovery packet is a layer link discovery protocol (LLDP) packet that comprises a plurality of time length value (TLV) structures containing the operational data; and
   embedding an application in a management agent of the network device, the management agent operable to determine operational data of the network device and the embedded application operable to format the discovery packet.

2. The method of claim 1, wherein the operational data is a health status of the network device.

3. The method of claim 1, wherein the discovery packet is sent at a predetermined time period.

4. The method of claim 1, wherein the discovery packet is sent on command of the management controller.

5. The method of claim 1, wherein the management controller is part of the switch.

6. The method of claim 1, wherein the management controller is external from the switch.

7. The method of claim 1, wherein the networked device is one of a plurality of network devices in a rack, the method further comprising determining the rack power consumption from receiving discovery packets from the plurality of network devices in the rack.

8. The method of claim 1, wherein the discovery packet is a field of a layer link discovery protocol signal.

9. A method of sending operational data to a network device, the network device coupled to a management controller, the method comprising:
   connecting the network device to a port of a switch;
   determining operational data relating to the operation of the network device including determining power consumption of the network device by monitoring a power supply of the network device; and
   sending a discovery packet including the operational data to the network device, wherein the operational data includes the power consumption of the network device, and wherein the discovery packet is a layer link discovery protocol (LLDP) packet that comprises a plurality of time length value (TLV) structures containing the operational data; and
   embedding an application in a management agent of the network device, the management agent operable to determine operational data of the network device and the embedded application operable to read the operational data from the discovery packet.

10. The method of claim 9, further comprising changing the operation of the network device in accordance with the operational data.

11. The method of claim 9, wherein the operational data is a maximum power cap for the network device.

12. The method of claim 9, wherein the management controller is a rack management controller and wherein the network device is associated with a rack and wherein the operational data is a rack identification of the rack.

13. A rack system comprising: a switch having a port;
a network device coupled to the port, the network device including a controller to determine power consumption of the network device; and
a rack management controller to send and receive discovery packets to and from the network device, wherein the discovery packets include operational data associated with the network device, wherein the operational data includes the power consumption of the network device and, wherein the discovery packet is a layer link discovery protocol (LLDP) packet that comprises a plurality of time length value (TLV) structures containing the operational data, and wherein the network device includes an embedded application in a management agent, the management agent operable to determine operational data of the network device and the embedded application operable to format the discovery packet.

14. The rack system of claim 13, wherein the operational data is determined from the operation of the network device from a baseboard management controller on the network device.

15. The rack system of claim 13, wherein the operational data is received by the management agent on the network device.

16. The rack system of claim 15, wherein the operational data is used by the management agent to operate the network device.

17. A method of determining operational data from a network device, the network device coupled to a management controller, wherein the networked device is one of a plurality of network devices in a rack, the method comprising:
connecting the network device to a port of a switch;
determining power consumption of the network device by monitoring a power supply of the network device;
determining operational data based on the operation of the network device, wherein the operational data includes the power consumption of the network device;
sending a discovery packet including the operational data to the management controller, wherein the discovery packet is a layer link discovery protocol (LLDP) packet that comprises a plurality of time length value (TLV) structures containing the operational data; and
determining the rack power consumption from receiving discovery packets from the plurality of network devices in the rack.

* * * * *